April 1, 1952  N. E. NILSSON  2,591,188
APPARATUS FOR RECOVERING THE INORGANIC
CONTENT OF CONCENTRATED WASTE LIQUOR
Filed July 5, 1947  3 Sheets-Sheet 1

INVENTOR
NILS ENOK NILSSON
ATTORNEYS

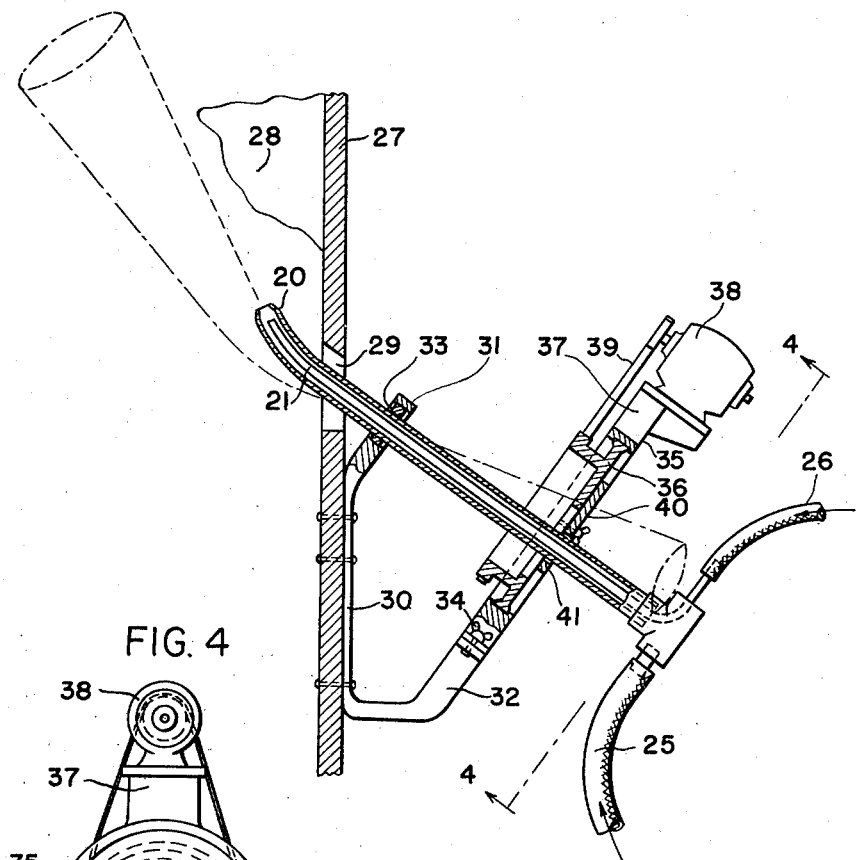
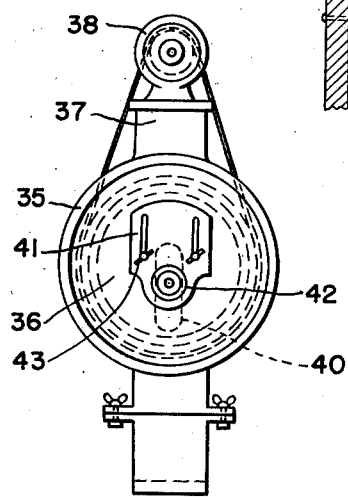

INVENTOR
NILS ENOK NILSSON
ATTORNEYS

Patented Apr. 1, 1952

2,591,188

UNITED STATES PATENT OFFICE 2,591,188

APPARATUS FOR RECOVERING THE INORGANIC CONTENT OF CONCENTRATED WASTE LIQUOR

Nils Enok Nilsson, Vaggeryd, Sweden

Application July 5, 1947, Serial No. 759,208
In Sweden November 25, 1946

2 Claims. (Cl. 23—277)

The present invention relates to methods and means for the recovery of the inorganic content of waste liquors which are rich in combustible organic substances, such as waste liquors from wood pulp digesters and the like.

More particularly the invention relates to such methods and means of the kind set forth, in which the recovery is effected by an initial removal of a portion of the water content of the liquor and a final drying of the concentrated liquor and removal of its organic content by burning it in a combustion chamber.

The primary object of the invention is to provide a method and means for practicing the same, which renders possible the recovery of a maximum portion of the inorganic content of waste liquors which are rich in combustible matter.

A further object of the invention is to provide a method and means of the kind set forth, in which the gases of combustion produced when burning the organic content of waste liquors become as free as possible from inorganic admixtures liable of settling in the flues leading from the combustion chamber or of polluting the atmosphere.

Another object of the invention is to provide a method and means whereby the inorganic content of waste liquors may be recovered in reduced condition, substantially suited for immediate repeated use in digesters for wood or the like.

The invention also has for its object to provide a recovery method and means for practicing said method which can operate continuously and effectively independently of the amount and composition of the waste liquors available in each particular case.

Further objects of the invention will appear from the following detailed description of suitable embodiments with reference to the accompanying drawings, in which Fig. 1 shows diagrammatically a cross section through a combustion chamber for concentrated waste liquor, arranged according to the invention;

Fig. 3 is a side view of a mechanism for oscillating the injector nozzle;

Fig. 4 shows the mechanism illustrated in Fig. 3 as viewed in the direction of the arrows 4—4 in Fig. 3.

Figure 1:
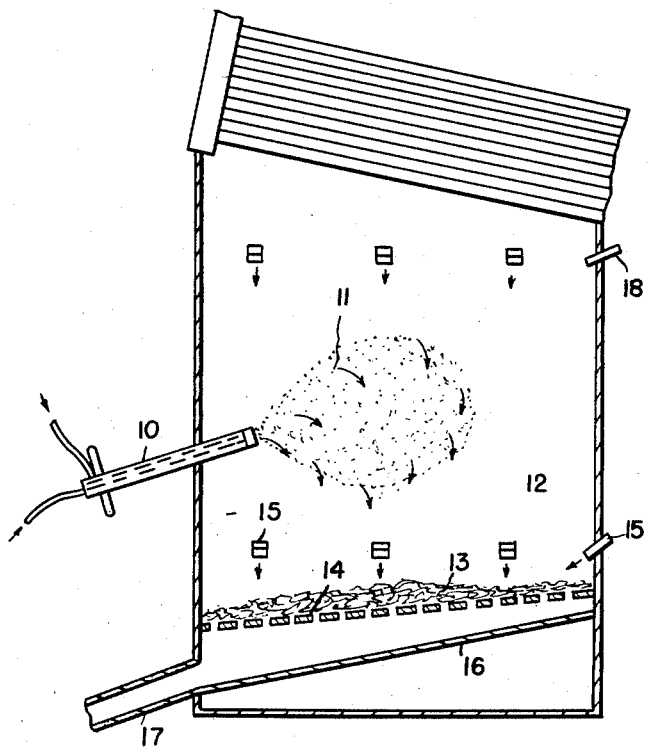

According to Fig. 1, which illustrates the fundamental features of the method according to the invention, the waste liquor, after initial concentration, is introduced with the aid of a suitable injector nozzle 10 together with primary air into the combustion chamber 12 in the form of a cloud or spray 11 of fine particles. The injector nozzle 10 is so designed and the supply of waste liquor and primary air so adjusted that the cloud or spray will be composed of a mixture of very fine and relatively larger waste liquor particles. Provided that the combustion chamber, for example through the burning therein of fuel oil or other high test fuel, has been heated to a sufficiently high starting temperature, the fine particles of the cloud are almost immediately relieved of their water content through evaporation and burn directly with the primary air, so that a hot flame is formed at the mouth of the injector nozzle. The larger particles begin to boil in the flame and, while continuing to give off water, fall onto the grating 13, where they accumulate in a solid glowing bed or pile 14, which is combusted with another quantity of primary air introduced adjacent to the bottom of the furnace through stationary nozzles or twyers 15 provided in the furnace walls. After reduction with the carbon present in the bed, the inorganic content of the waste liquor collects in smelted condition on the sloping bottom 16 of the combustion chamber and flows off through the spout 17. The gases of combustion produced through the incomplete combustion with primary air are completely combusted in the upper part of the combustion chamber by means of secondary air introduced through the stationary nozzles 18.

The best results of the recovery method are obtained if, in accordance with the invention, the waste liquor is introduced into the combustion chamber in such a manner that the cloud or spray of waste liquor particles floats freely in the combustion chamber, so that the flame may develop freely and as small a portion as possible of the waste liquor particles reaches the opposite wall. The larger particles, which in spite of all reach the wall, are doing this in so dry a condition that they do not stick or adhere to the wall to any great extent but drop almost immediately to the bottom of the furnace, where they are combusted together with the rest of the larger particles.

Tests carried out with the means shown in Fig. 1 and described above have shown that the gases of combustion leaving the combustion chamber are relieved to a great extent of inorganic matter, involving that a considerably better recovery of the mineral content from the waste liquor introduced is obtained than is the case in previously known combustion systems. This means that a steam boiler, which may be heated by the combustion gases, as well as any following heat absorbing apparatus keep their surfaces much better clean and are more readily kept clean than in other plants. Furthermore, no deposit worth mentioning takes place on the walls of the combustion chamber but the major portion collects directly on the sloping bottom of the chamber. This advantageous condition might be explained in the following manner.

Through the direct combustion of the combustible substances in the finest waste liquor particles, while the latter float in the primary air in front of the mouth of the injector nozzle, so high a temperature is produced that the mineral content of said particles is gasified. Through contact with the adjacent larger particles, which are not yet dry, the gases thus formed are immediately cooled down, however, sublimate on the larger particles, and are carried along with said particles to the bottom of the combustion chamber, where the combustion of the combustible substances in the layer or bed of solid matter takes place at so low a temperature that no repeated gasification can take place. The cloud or spray of larger waste liquor particles in front of the injector nozzle thus serves as a kind of filter, which absorbs the gasified inorganic content of the directly combusted smallest particles and thus prevents, to a large extent, the loss of inorganic matter together with the gases of combustion leaving the furnace.

Figure 2:
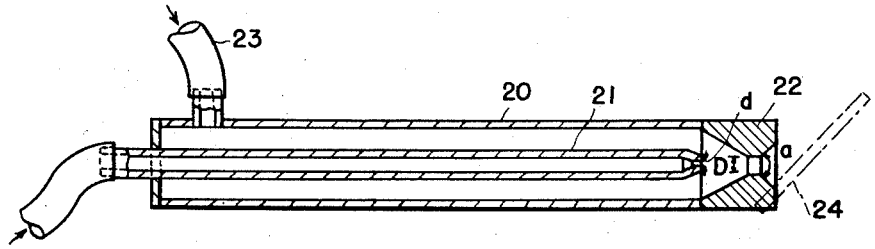
Fig. 2 shows on a larger scale a suitable type of nozzle for injecting waste liquors in the form of a cloud or spray.

An injector nozzle, which is particularly suitable for producing a cloud or spray of waste liquor particles having the desired ratio between smaller and larger particles, is illustrated in Fig. 2. The said nozzle consists of an outer tube 20 and an inner narrower tube 21 arranged centrally in the former. Mounted on the mouth of the outer tube 20 is a mouth-piece 22 of fire-resistive material having a restricted section with the internal diameter D. The central narrow tube 21 ends within the outer tube 20 with a restricted opening having the diameter $d$. The diameter D of the narrowest portion of the mouth-piece 22 is preferably considerably larger than the diameter $d$ of the mouth of the inner tube, for example about three times larger. The waste liquor is supplied to the outer tube 20 through a conduit 23 under a pressure of, for instance, 4 kg./cm.$^2$, whereas the primary air is supplied to the inner tube 21 under a higher pressure, for example 8 kg./cm.$^2$, and preferably pre-heated to 100–300° C. The introduction of the compressed air centrally in the waste liquor nozzle results in an atomization of the core of the spray of liquid, which burns. The burning core is surrounded by a layer of larger non-burning waste liquor particles. The larger particles in the outer layer boil and dry while passing the flame and dropping to the floor and collect, during their passage through the burning core, any gasified mineral matter existing in the core. The ratio between larger and finer waste liquor particles, which is most suitable in each particular case, may be had by a suitable selection of the top angle $a$ of the outer cone of the mouth-piece 22.

In the injector nozzle described the waste liquor is preferably introduced by means which are independent of the compressed air. The nozzle is preferably directed not straight towards an opposite wall but so that the flame may develop freely. In some instances, it may be desirable to provide the nozzle for this purpose with a deflector plate 24, which changes the direction of the spray of waste liquor particles and primary air.

For obtaining best results it is, furthermore, important that the recovery process should run as continuously as possible while producing as constant an amount of heat as possible in the combustion chamber. When the supply of waste liquor varies, as well as when waste liquors having a particularly low heat value are concerned, the desired compensation may be obtained by supplying fuel oil or other high-grade extra fuel in amounts determined to meet the actual conditions. Said supply of extra fuel may be introduced into the combustion chamber through the ordinary injector nozzle in admixture with the concentrated waste liquor. Through the addition of extra fuel in this manner it is also possible to utilize the heat produced in a more effective manner, for instance for the generation of steam for heating the digesters and for other purposes.

Particularly good results are obtained if the nozzle, through which the waste liquor is introduced in the combustion chamber in atomized condition together with a suitable amount of primary air, is made to perform a slowly oscillating movement, for example along the surface of a cone, so that an even distribution of the spray of atomized waste liquor and primary air is obtained over a greater part of the combustion chamber. If the injector nozzle performs an oscillating movement, the spray does not so easily reach the opposite wall, which should be avoided, and, furthermore, the drying of the larger particles during their fall to the grating at the bottom of the combustion chamber is facilitated.

A suitable embodiment of an oscillatory injector nozzle is shown in Figs. 3 and 4. According to said figures the waste liquor is supplied to the outer tube 20 through a flexible conduit 25, while the primary air is supplied to the inner tube 21 through a flexible conduit 26. The spray of atomized waste liquor and primary air produced has the main direction indicated in Fig. 3 with a dotted line.

Mounted on an external wall 27 of the combustion chamber 28, in which an opening 29 is provided for the introduction of the injector nozzle 20, 21, is a bracket 30 having two parallel legs 31 and 32. In the upper leg 31 the nozzle tube 20 is pivotally journalled in a spherical bearing 33. Detachably mounted on the lower leg 32 by means of wing nuts 34 is a ring 35 provided with a circular inner bearing surface for a disc 36, which is rotatable in the ring. Made integral with the bearing ring 35 is a bracket 37 for an electric motor 38, which by means of a chain or belt transmission 39 rotates the disc 36 at a reduced speed.

Provided in the disc 36 is a diametrically extending slot 40, along which a plate 41 provided with a spherical bearing 42 for the rear portion of the nozzle is displaceable, so that the desired eccentricity between the axis of rotation of the disc 36 and the center of the spherical bearing 42 is obtained. For locking the plate 41 in the desired position there are provided two wing nuts 43.

On starting the motor 38 the injector nozzle evidently performs an oscillating movement about the spherical bearing 33, the main direction of the jet of atomized fuel and primary air emitted from the nozzle then describing the surface of a circular cone, as is indicated in Fig. 3. In this manner an effective spraying of the waste liquor jet over a considerable part of the combustion chamber 28 and a very complete combustion of the liquid fuel with the primary air is obtained.

Figure 5:
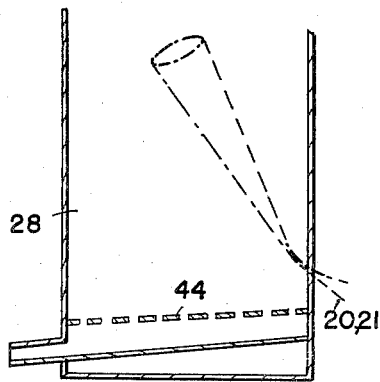
Figs. 5 to 7 show different ways of mounting the injector device with respect to the combustion chamber.
Figure 6:
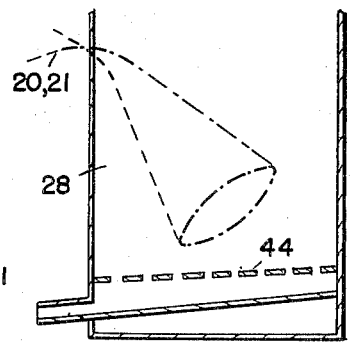
Figure 7:
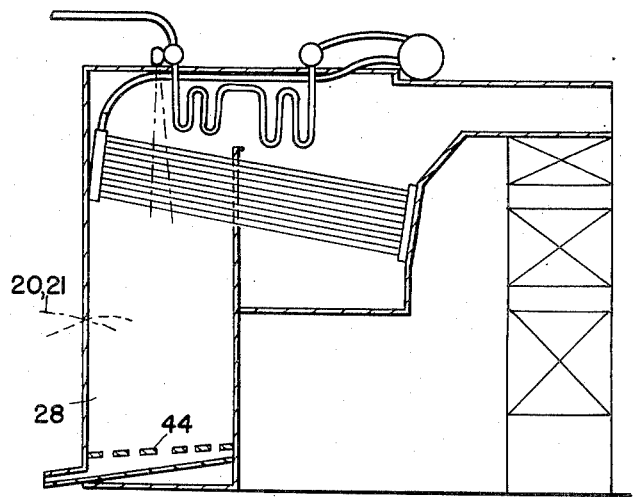

In Figs. 5 to 7 are shown some suitable ways of mounting the oscillating injector nozzle. In Fig. 5 the nozzle is mounted immediately above the grating 44 in one side wall of the combustion chamber, the main direction of the jet pointing upwardly and rearwardly, substantially in accordance with the arrangement shown in Figs. 3 and 4. According to Fig. 6 the nozzle is mounted in the upper part of the combustion chamber and directed substantially rearwardly and downwardly. Fig. 7 shows an arrangement in connection with the combustion chamber for a steam boiler, where the nozzle is mounted substantially half way between the bottom and top of the chamber and is directed towards the opposite wall. In this case a deflector plate for changing the direction of the jet may be necessary.

It is obvious that the invention is not limited to the embodiments shown, but modifications of various kinds are conceivable without receding from the idea of the invention.

What I claim is:

1. An apparatus for recovering the inorganic content of concentrated waste liquor rich in combustible organic substances comprising a combustion chamber, a first tubular member having an exit orifice extending into the upper part of said chamber, said member having an inlet orifice connected with a supply source of waste liquor under pressure, a second tubular member concentrically arranged within said first member, said second member having an inlet orifice and an exit orifice adjacent the exit orifice of said first member, means for supplying air to said inlet orifice of the second member at a pressure higher than the supply pressure of said liquor, said exit orifice of said first tubular member being considerably larger than the exit orifice of said second member whereby the waste liquor is split into a spray of coarser and finer particles, in which the finer particles are concentrated to the core of the spray and appear in said core in admixture with the primary air while the larger particles form an outer layer around said core, the burning of the core of the spray occurring only while in suspension and still surrounded by the larger particles of the outer layer, collecting means at the bottom of the chamber for collecting the descending mass of larger particles after said particles have given off their water content and have absorbed the inorganic content of the burning finer particles, and additional air supply means at the bottom of the chamber for burning the organic content of the collected mass.

2. A device in accordance with claim 1 wherein there is provided eccentric bearing means for supporting said first tubular member and means for rotating said bearing means to cause said tubular members to oscillate.

NILS ENOK NILSSON.

REFERENCES CITED

The following references are of record in the file of this patent:

UNITED STATES PATENTS

| Number | Name | Date |
| --- | --- | --- |
| 450,052 | Bliss | Apr. 7, 1891 |
| 901,232 | Eldred | Oct. 13, 1908 |
| 1,059,980 | Cross | Apr. 29, 1913 |
| 1,403,160 | Haner | Jan. 10, 1922 |
| 1,621,509 | Humanson et al. | Mar. 22, 1927 |
| 1,771,829 | Wagner | July 29, 1930 |
| 1,881,359 | Jones | Oct. 4, 1932 |
| 2,050,400 | Wagner | Aug. 11, 1936 |
| 2,213,052 | Rosencrants | Aug. 27, 1940 |